(12) United States Patent
Shibutake et al.

(10) Patent No.: US 10,358,175 B2
(45) Date of Patent: Jul. 23, 2019

(54) DEFLECTOR STRUCTURE OF AUTOMOBILE

(71) Applicant: MAZDA MOTOR CORPORATION, Aki-gun, Hiroshima (JP)

(72) Inventors: Nobuyuki Shibutake, Higashihiroshima (JP); Koji Yoshitake, Hiroshima (JP); Nobuyuki Nakayama, Hiroshima (JP); Takashi Fukumaru, Kure (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/759,187

(22) PCT Filed: Oct. 6, 2016

(86) PCT No.: PCT/JP2016/079807
§ 371 (c)(1),
(2) Date: Mar. 9, 2018

(87) PCT Pub. No.: WO2017/068991
PCT Pub. Date: Apr. 27, 2017

(65) Prior Publication Data
US 2018/0251165 A1    Sep. 6, 2018

(30) Foreign Application Priority Data

Oct. 22, 2015  (JP) ................. 2015-207674

(51) Int. Cl.
*B62D 35/00*  (2006.01)
*B62D 35/02*  (2006.01)

(52) U.S. Cl.
CPC ............ *B62D 35/005* (2013.01); *B62D 35/02* (2013.01); *Y02T 10/82* (2013.01); *Y02T 10/88* (2013.01)

(58) Field of Classification Search
CPC ........ B62D 35/005; B62D 35/02; Y02T 10/82
(Continued)

(56) References Cited

U.S. PATENT DOCUMENTS

| 2006/0017311 A1* | 1/2006 | Suwa | ...................... B60R 19/24 296/203.02 |
| 2013/0026783 A1* | 1/2013 | Kakiuchi | ............... B62D 35/02 296/180.1 |

(Continued)

FOREIGN PATENT DOCUMENTS

| JP | 200813013 A | 1/2008 |
| JP | 2009227159 A | 10/2009 |

(Continued)

OTHER PUBLICATIONS

ISA Japan Patent Office, International Search Report Issued in PCT Application No. PCT/JP2016/079807, dated Dec. 27, 2016, WIPO, 1 page.

*Primary Examiner* — Gregory A Blankenship
(74) *Attorney, Agent, or Firm* — Alleman Hall Creasman & Tuttle LLP

(57) ABSTRACT

A deflector structure of an automobile includes: a liner extended portion covering a lower-surface opening located at a front side of a wheel housing; and a deflector attached to the liner extended portion. The deflector is integrally configured by: a deflector base portion attached to the liner extended portion through a bolt and a resin clip; and a plate-shaped deflector main body extending from a rear end of the deflector base portion to a vehicle lower side and having flexibility and a thickness in a forward/rearward direction. A plurality of rear-surface ribs each extending in an upward/downward direction are formed on a rear surface of the deflector main body at predetermined intervals in a (Continued)

width direction, upper ends of the rear-surface ribs being in contact with a lower surface of the liner extended portion.

9 Claims, 7 Drawing Sheets

(58) Field of Classification Search
USPC .................................................. 296/180.1
See application file for complete search history.

(56) References Cited

U.S. PATENT DOCUMENTS

| | | | | |
|---|---|---|---|---|
| 2013/0026790 | A1* | 1/2013 | Kakiuchi | B62D 35/02 |
| | | | | 296/193.07 |
| 2015/0210324 | A1* | 7/2015 | Kojima | B62D 35/005 |
| | | | | 296/180.1 |
| 2015/0225026 | A1* | 8/2015 | Ohira | B62D 25/08 |
| | | | | 296/180.1 |
| 2015/0266522 | A1* | 9/2015 | Ishikawa | B62D 35/02 |
| | | | | 296/180.1 |
| 2016/0214662 | A1* | 7/2016 | Emura | B62D 25/16 |
| 2016/0339970 | A1* | 11/2016 | Shibutake | B62D 35/005 |
| 2017/0057567 | A1 | 3/2017 | Aoki | |
| 2018/0251165 | A1* | 9/2018 | Shibutake | B62D 35/005 |

FOREIGN PATENT DOCUMENTS

| | | |
|---|---|---|
| JP | 2012086657 A | 5/2012 |
| JP | 201476704 A | 5/2014 |
| JP | 2014076704 A | 5/2014 |
| JP | 2017043178 A | 3/2017 |

* cited by examiner

DEFLECTOR STRUCTURE OF AUTOMOBILE

TECHNICAL FIELD

The present invention relates to a deflector structure of an automobile, the deflector structure being provided at, for example, a vehicle front side of a front wheel housing of a vehicle front portion of the automobile and configured to suppress flow of traveling wind into the front wheel housing.

BACKGROUND ART

Conventionally, traveling automobiles receive air resistance generated by collision, friction, or the like with air (traveling wind). Since the air resistance significantly affects the power performance and fuel efficiency of the automobile, it is desirable to reduce the air resistance by air straightening realized by a vehicle body shape, a straightening plate, etc.

One example of the air resistance that affects the performance of the automobile while the automobile is traveling is air resistance generated by turbulence of side-surface flow at a vehicle side surface. This occurs since the traveling wind flowing into the front wheel housing through an underfloor of the vehicle front portion of the automobile is discharged toward a vehicle lateral side while being disturbed by the rotation of a front wheel.

Known as one example of a technology of suppressing the flow of the traveling wind into the front wheel housing is a deflector provided at a vehicle front side of the front wheel housing and projecting to a vehicle lower side of a lower end of a front bumper (see PTL 1).

According to the deflector of PTL 1, an unintentional load from a vehicle rear side may be applied to the deflector. One example of this is a case where the automobile moves backward in a state where an obstacle is present between the front wheel and the deflector.

Therefore, the deflector is required to have both rigidity capable of receiving a load such as the traveling wind from the vehicle front side and flexibility capable of releasing the unintended load from the vehicle rear side.

CITATION LIST

Patent Literature

PTL 1: Japanese Laid-Open Patent Application Publication No. 2012-86657

SUMMARY OF INVENTION

Technical Problem

The present invention was made to solve the above problems, and an object of the present invention is to provide a deflector structure of an automobile, the deflector structure being capable of securing both rigidity of a deflector main body with respect to a load applied from a vehicle front side and flexibility of the deflector main body with respect to a load applied from a vehicle rear side.

Solution to Problem

The present invention is a deflector structure of an automobile, the deflector structure including: a cover member covering a lower-surface opening located at a vehicle front side of a front wheel housing of a vehicle front portion of the automobile; and a deflector attached to the cover member, wherein: the deflector is integrally configured by a deflector base portion attached to the cover member through an engaging member and a substantially flat plate-shaped deflector main body extending from a rear end of the deflector base portion to a vehicle lower side and having flexibility and a thickness in a vehicle forward/rearward direction; and a plurality of rear-surface ribs each extending in a vehicle upward/downward direction are formed on a rear surface of the deflector main body at predetermined intervals in a vehicle width direction, upper ends of the rear-surface ribs being in contact with a lower surface of the cover member.

The cover member may be a cover member formed integrally with a fender liner covering the front wheel housing or a cover member configured separately from the fender liner. Further, the cover member may be made of hard synthetic resin such as polypropylene.

The deflector may be made of soft synthetic resin such as rubber having flexibility.

The engaging member may be a member engaged with the cover member or a member engaged with a front bumper while sandwiching the cover member. Examples of the engaging member include a resin clip and a bolt.

The present invention can secure both the rigidity of the deflector main body with respect to the load applied from the vehicle front side and the flexibility of the deflector main body with respect to the load applied from the vehicle rear side.

Specifically, when the load is applied from the vehicle front side to the deflector main body, the deflector main body is about to deform so as to be bent toward the vehicle rear side. In this case, since the rear-surface ribs are in contact with the lower surface of the cover member, the rear-surface ribs can support the deflector main body from the vehicle rear side.

Therefore, when the load is applied from the vehicle front side to the deflector main body, the deflector structure of the automobile can suppress the bending deformation of the deflector main body toward the vehicle rear side by the rear-surface ribs.

In contrast, when the load is applied from the vehicle rear side to the deflector main body, the deflector main body is about to deform so as to be bent toward the vehicle front side. In this case, since the rear-surface ribs can easily separate from the lower surface of the cover member, the rear-surface ribs can deform so as to be bent toward the vehicle front side together with the deflector main body.

Therefore, when the load is applied from the vehicle rear side to the deflector main body, the deflector structure of the automobile can easily cause the bending deformation of the deflector main body toward the vehicle front side.

With this, the deflector structure of the automobile can suppress the flow of the traveling wind into the front wheel housing and can also prevent the deflector main body from being damaged by an unintentional load applied from the vehicle rear side.

Therefore, the deflector structure of the automobile can secure both the rigidity of the deflector main body with respect to the load applied from the vehicle front side and the flexibility of the deflector main body with respect to the load applied from the vehicle rear side and can secure stable air straightening performance.

As one aspect of the present invention, the deflector structure may be configured such that a plurality of front-surface ribs each extending from a lower surface of the deflector base portion to the vehicle lower side are formed on a front surface of the deflector main body at predetermined intervals in the vehicle width direction.

According to the present invention, when the load is applied from the vehicle front side to the deflector main body, the deflector structure of the automobile can further suppress the bending deformation of the deflector main body toward the vehicle rear side by cooperation of the front-surface ribs and the rear-surface ribs.

Therefore, the deflector structure of the automobile can stably suppress the flow of the traveling wind into the front wheel housing.

On this account, the deflector structure of the automobile can stably secure the rigidity of the deflector main body with respect to the load applied from the vehicle front side.

As another aspect of the present invention, the deflector structure may be configured such that the front-surface ribs are formed at respective positions different from positions of the rear-surface ribs in the vehicle width direction.

According to the present invention, even when the front-surface ribs are provided, the deflector structure of the automobile can secure the flexibility of the deflector main body with respect to the load applied from the vehicle rear side.

Specifically, for example, if the front-surface ribs are formed at respective positions that are substantially the same as the positions of the rear-surface ribs in the vehicle width direction, the front-surface ribs support the rear-surface ribs while sandwiching the deflector main body. Therefore, when the load is applied from the vehicle rear side to the deflector main body, the bending deformation of the deflector main body toward the vehicle front side may be excessively suppressed.

However, according to the deflector structure of the automobile, the front-surface ribs are formed at respective vehicle width direction positions different from the vehicle width direction positions of the rear-surface ribs. With this, the deflector structure of the automobile can prevent the front-surface ribs from supporting the rear-surface ribs while sandwiching the deflector main body.

With this, when the load is applied from the vehicle rear side to the deflector main body, the deflector structure of the automobile can prevent the bending deformation of the deflector main body toward the vehicle front side from being excessively suppressed by the rear-surface ribs.

According to the deflector structure of the automobile, the front-surface ribs are formed at respective vehicle width direction positions different from the vehicle width direction positions of the rear-surface ribs. Therefore, even when the front-surface ribs are provided, the deflector structure of the automobile can secure the flexibility of the deflector main body with respect to the load applied from the vehicle rear side.

As yet another aspect of the present invention, the deflector structure may be configured such that each of the front-surface ribs is formed to extend from a position of the lower surface of the deflector base portion, the position being located at a vehicle rear side of a vehicle forward/rearward direction substantially middle between a rear end of the engaging member located at the vehicle front side of the deflector main body and adjacent to the deflector main body and the front surface of the deflector main body.

According to the present invention, the deflector structure of the automobile can prevent the engaged state of the engaging member from being released by the load applied from the vehicle rear side.

Specifically, when the load is applied from the vehicle rear side to the deflector main body, the deflector main body causes the bending deformation so as to be turned toward the vehicle front side around upper front ends of the front-surface ribs as a rotational center.

In this case, the load toward the vehicle lower side which causes the deflector base portion to separate from the cover member gradually from a rear end of the deflector base portion acts on the deflector base portion as the bending deformation of the deflector main body toward the vehicle front side proceeds.

As above, the deflector main body causes the bending deformation so as to be turned toward the vehicle front side around the upper front ends of the front-surface ribs as the rotational center. Therefore, for example, if each of the front-surface ribs extends from a position of the lower surface of the deflector base portion which position is located at the vehicle front side of the engaging member, the load acting on the deflector base portion toward the vehicle lower side tends to be transmitted to the engaging member.

Therefore, when the load is applied from the vehicle rear side to the deflector main body, the engaging member may be separated or damaged by the load acting toward the vehicle lower side.

Each of the front-surface ribs extends from a position of the lower surface of the deflector base portion which position is located at the vehicle rear side of a vehicle forward/rearward direction substantially middle between the rear end of the engaging member and the front surface of the deflector main body. With this, the deflector structure of the automobile can prevent the load acting on the deflector base portion toward the vehicle lower side from being transmitted to the engaging member.

With this, the deflector structure of the automobile can prevent the separation and damage of the engaging member and also prevent the damage of the deflector base portion pressed by the engaging member.

According to the deflector structure of the automobile, each of the front-surface ribs extends from the position located at the vehicle rear side of the vehicle forward/rearward direction substantially middle between the rear end of the engaging member and the front surface of the deflector main body. With this, the deflector structure of the automobile can prevent the engaged state of the engaging member from being released by the load applied from the vehicle rear side.

As still another aspect of the present invention, the deflector structure may be configured such that the front-surface ribs are formed at respective positions different from a position of the engaging member in the vehicle width direction, the engaging member being located at the vehicle front side of the deflector main body and adjacent to the deflector main body.

According to the present invention, the deflector structure of the automobile can more surely prevent the engaged state of the engaging member from being released by the load applied from the vehicle rear side.

Specifically, for example, if the front-surface rib is formed at a vehicle width direction position that is substantially the same as the vehicle width direction position of the engaging member, the load applied from the vehicle rear side to the deflector main body tends to be transmitted to the engaging member through the front-surface rib and the deflector base portion as the load acting toward the vehicle lower side.

Therefore, when the load is applied from the vehicle rear side to the deflector main body, the load toward the vehicle lower side acts on the engaging member, and this may cause separation or damage of the engaging member.

However, since the front-surface ribs are formed at respective vehicle width direction positions different from the vehicle width direction position of the engaging member, the deflector structure of the automobile can prevent the load acting on the deflector base portion toward the vehicle lower side from acting on the engaging member.

With this, the deflector structure of the automobile can prevent the separation and damage of the engaging member and also prevent the damage of the deflector base portion pressed by the engaging member.

Therefore, since the front-surface ribs are formed at respective vehicle width direction positions different from the vehicle width direction position of the engaging member, the deflector structure of the automobile can more surely prevent the engaged state of the engaging member from being released by the load applied from the vehicle rear side.

As yet another aspect of the present invention, the deflector structure may be configured such that the number of front-surface ribs is smaller than the number of rear-surface ribs.

According to the present invention, the deflector structure of the automobile can more surely secure the flexibility of the deflector main body with respect to the load applied from the vehicle rear side.

Specifically, if the number of front-surface ribs is equal to or larger than the number of rear-surface ribs, the rigidity of the deflector main body with respect to the load applied from the vehicle rear side may be substantially equal to or higher than the rigidity of the deflector main body with respect to the load applied from the vehicle front side. Therefore, when the load is applied from the vehicle rear side to the deflector main body, the bending deformation of the deflector main body toward the vehicle front side may be excessively suppressed.

On this account, the number of front-surface ribs is smaller than the number of rear-surface ribs. With this, even when the deflector structure of the automobile is provided with the front-surface ribs, the rigidity of the deflector main body with respect to the load applied from the vehicle rear side can be prevented from becoming higher than the rigidity of the deflector main body with respect to the load applied from the vehicle front side.

With this, when the load is applied from the vehicle rear side to the deflector main body, the deflector structure of the automobile can more surely prevent the bending deformation of the deflector main body toward the vehicle front side from being excessively suppressed by the front-surface ribs.

Therefore, since the number of front-surface ribs is smaller than the number of rear-surface ribs, the deflector structure of the automobile can more surely secure the flexibility of the deflector main body with respect to the load applied from the vehicle rear side.

Advantageous Effects of Invention

The present invention can provide the deflector structure of the automobile, the deflector structure being capable of securing both the rigidity of the deflector main body with respect to the load applied from the vehicle front side and the flexibility of the deflector main body with respect to the load applied from the vehicle rear side.

DESCRIPTION OF EMBODIMENTS

Hereinafter, one embodiment of the present invention will be explained in reference to the drawings.

A deflector structure of an automobile 1 according to the present embodiment will be explained based on FIGS. 1 to 6.

Figure 1:
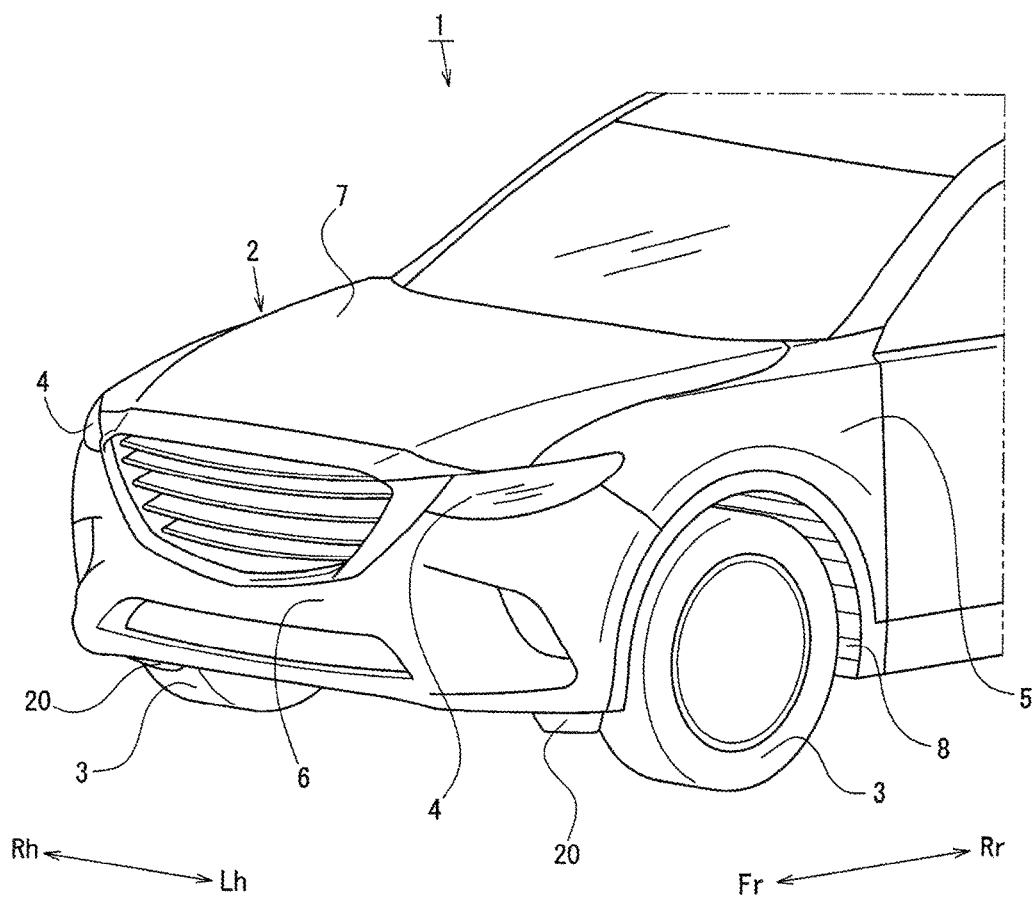
FIG. 1 is an appearance perspective view showing an appearance of a vehicle front portion of an automobile.
Figure 2:
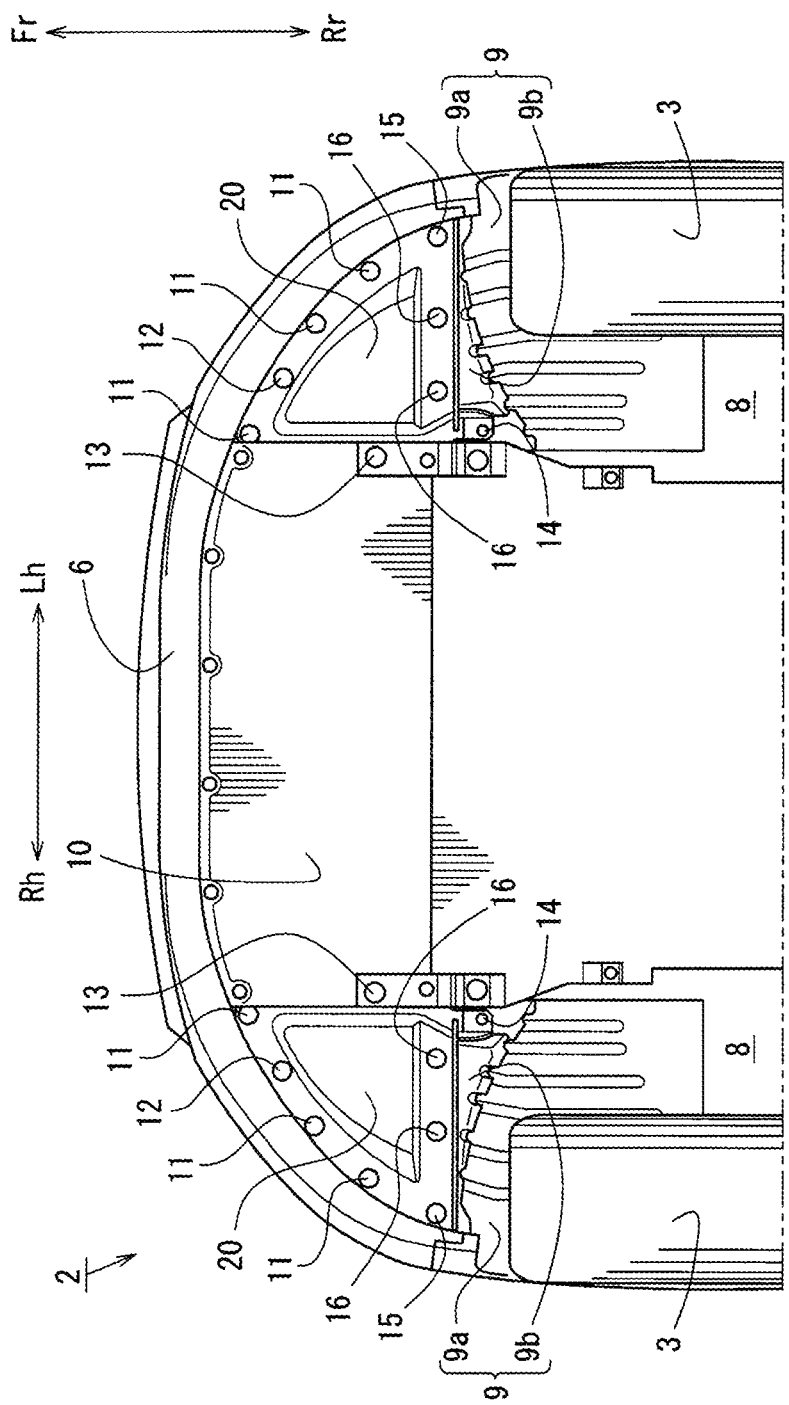
FIG. 2 is a bottom view showing the vehicle front portion of the automobile.
Figure 3:
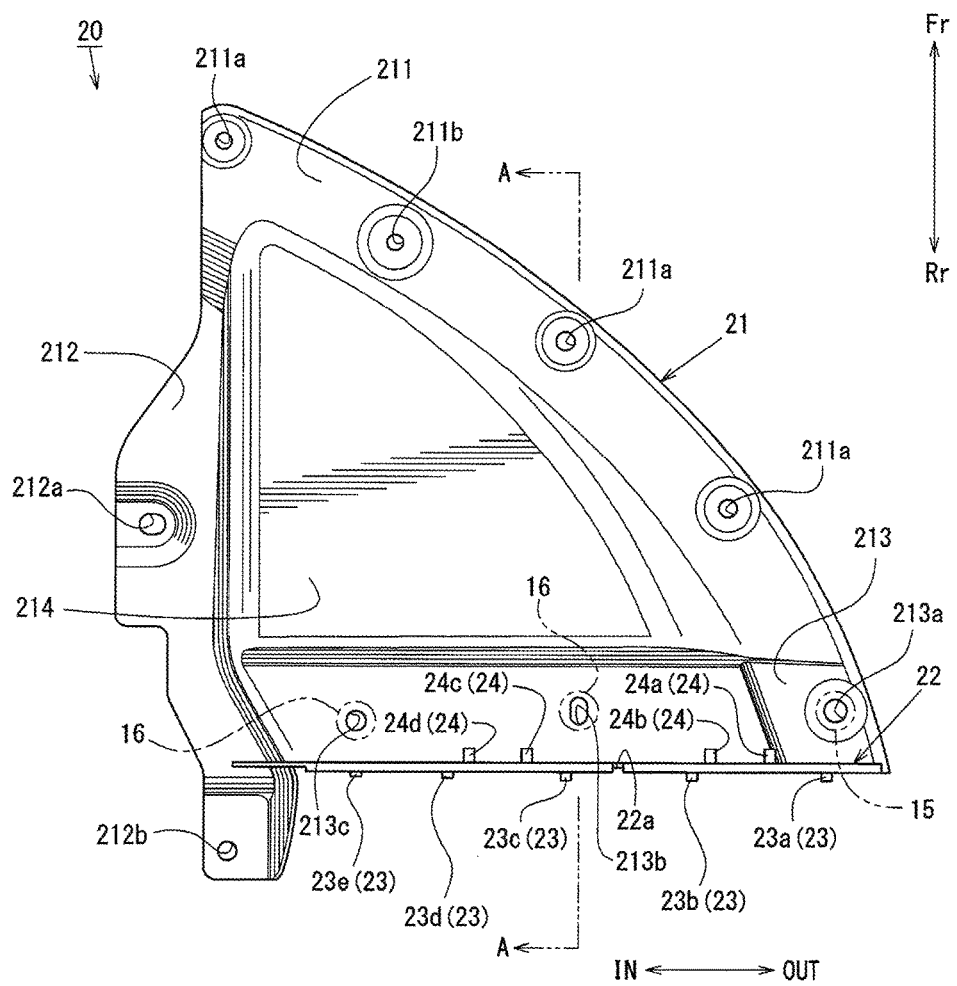
FIG. 3 is a bottom view showing a deflector at a vehicle left side.
Figure 4:
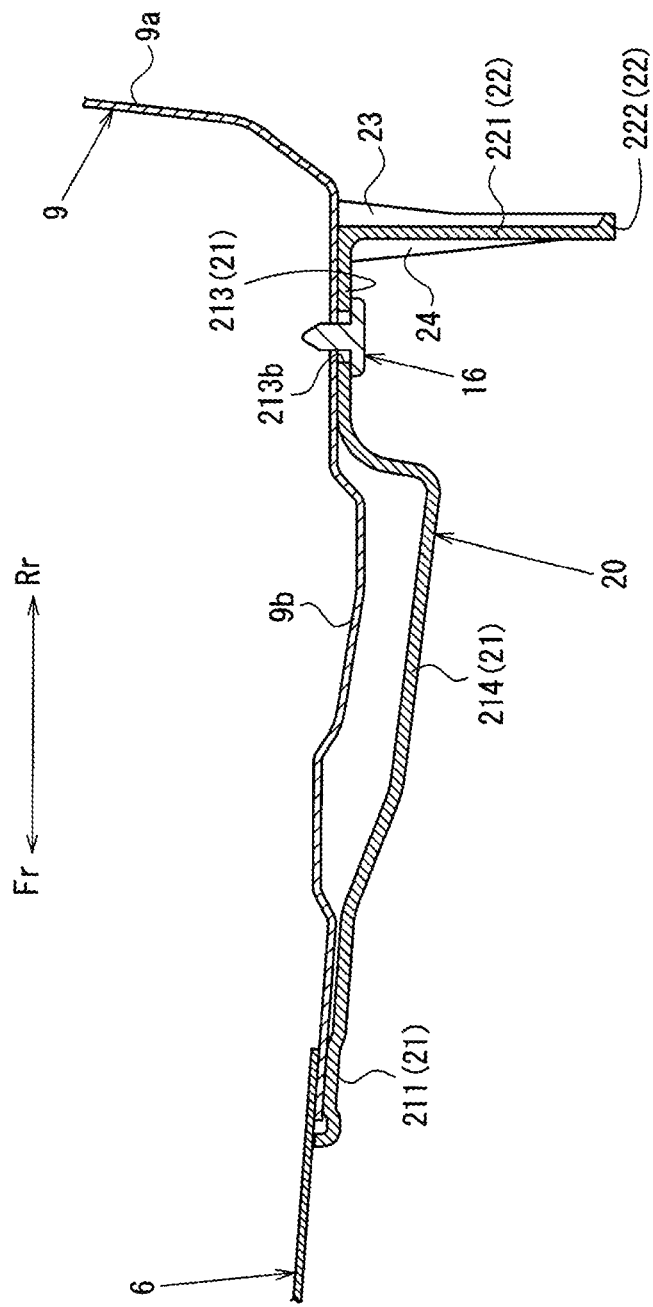
FIG. 4 is a sectional view taken along line A-A of FIG. 3 and showing an attached state.
Figure 5:
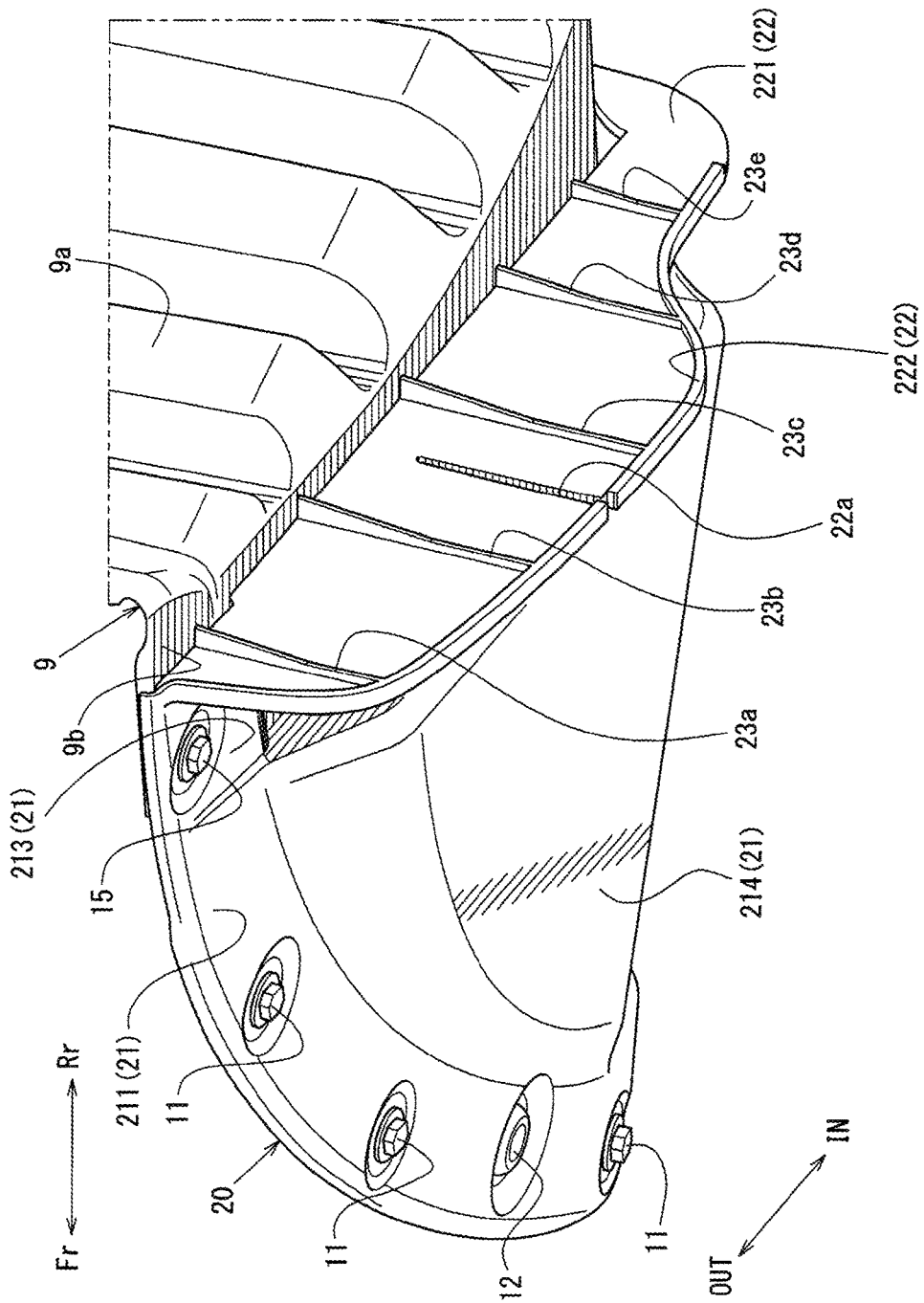
FIG. 5 is an appearance perspective view showing an appearance of a deflector main body when viewed from a vehicle rear side.
Figure 6:
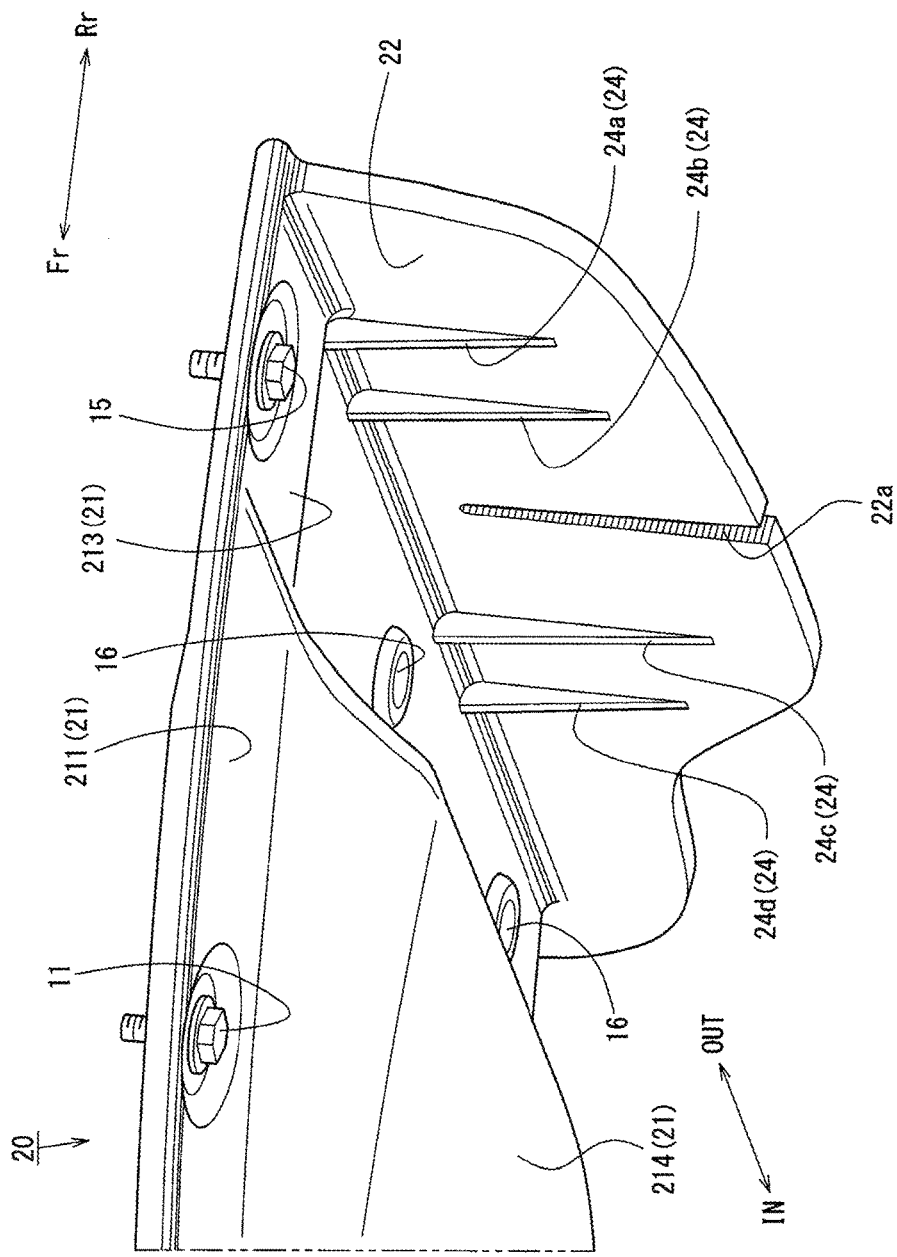
FIG. 6 is an appearance perspective view showing an appearance of the deflector main body when viewed from a vehicle front side.

FIG. 1 is an appearance perspective view showing a vehicle front portion 2 of the automobile 1. FIG. 2 is a bottom view showing the vehicle front portion 2 of the automobile 1. FIG. 3 is a bottom view showing a deflector 20 at a vehicle left side. FIG. 4 is a sectional view taken along line A-A of FIG. 3 and showing an attached state. FIG. 5 is an appearance perspective view showing a deflector main body 22 when viewed from a vehicle rear side. FIG. 6 is an appearance perspective view showing the deflector main body 22 when viewed from a vehicle front side.

In the drawings, arrows Fr and Rr indicate a vehicle forward/rearward direction. The arrow Fr indicates a vehicle front side, and the arrow Rr indicates a vehicle rear side. Further, arrows Rh, Lh, IN, and OUT indicate a vehicle width direction. The arrow Rh indicates a vehicle rightward direction, and the arrow Lh indicates a vehicle leftward direction. The arrow IN indicates a vehicle width direction inner side, and the arrow OUT indicates a vehicle width direction outer side. In addition, an upper side in the drawings corresponds to a vehicle upper side, and a lower side in the drawings corresponds to a vehicle lower side.

As shown in FIG. 1, the vehicle front portion 2 of the automobile 1 is a portion located at the vehicle front side of a cabin in which a driver gets. The vehicle front portion 2 of the automobile 1 has a function of absorbing and dispersing a collision load transmitted from the vehicle front portion 2 to the driver's seat. The vehicle front portion 2 of the automobile 1 includes a mounting space in which components related to traveling of the automobile 1 are mounted. Examples of such components include an engine, a transmission, a cooling device, a suspension device, a steering device, and front wheels 3. The vehicle front portion 2 of the automobile 1 further includes lights for vehicle front and lateral sides. Examples of such lights include a headlight 4 and a fog lamp.

The vehicle front portion 2 of the automobile 1 includes: a pair of left and right front wheels 3; a pair of left and right front fenders 5 forming side surfaces of the vehicle front portion 2; a front bumper 6 provided at tip ends of the front fenders 5; a hood 7 covering an opening surrounded by the front fenders 5 and the front bumper 6 and located at the vehicle upper side; and the like.

As shown in FIGS. 1 and 2, a bottom surface of the vehicle front portion 2 of the automobile 1 includes: fender liners 9 each covering an inside of a wheel housing 8 accommodating the front wheel 3; and an engine under cover 10 covering a portion between the left and right front wheels 3 in the vehicle width direction.

Each of the fender liners 9 is made of, for example, hard synthetic resin such as polypropylene and is integrally formed by: a liner main body 9a covering the inside of the wheel housing 8 and having a substantially circular-arc shape in side view; and a liner extended portion 9b extending from a front lower end of the liner main body 9a to the vehicle front side.

The liner extended portion 9b is formed in such a shape as to be able to close an opening surrounded by a front end of the wheel housing 8, the front bumper 6, and the engine under cover 10 and having a substantially fan shape in bottom view.

As shown in FIGS. 1 to 3, the bottom surface of the vehicle front portion 2 of the automobile 1 further includes a pair of left and right deflectors 20 provided at the vehicle front side of the front wheels 3 and projecting to the vehicle lower side of a lower end of the front bumper 6. Each of the left and right deflectors 20 has a function of straightening the traveling wind flowing from the vehicle front side to suppress the flow of the traveling wind into the wheel housing 8.

The deflector 20 at the vehicle left side and the deflector 20 at the vehicle right side are symmetrical in a leftward-rightward direction with respect to a center line passing through a vehicle width direction substantially middle portion of the vehicle 1 and extending along the vehicle forward/rearward direction. Therefore, the present embodiment will explain the deflector 20 at the vehicle left side.

More specifically, the deflector 20 is made of soft synthetic resin, such as synthetic rubber having flexibility, which is softer than the material of the fender liner 9.

As shown in FIGS. 3 and 4, the deflector 20 is integrally formed by: a deflector base portion 21 attached to a lower surface of the liner extended portion 9b of the fender liner 9; and a deflector main body 22 extending from a rear end of the deflector base portion 21 to the vehicle lower side and having a substantially flat plate shape.

The deflector base portion 21 is formed in such a substantially fan shape in bottom view that an edge side thereof extending in the vehicle width direction is turned toward the vehicle front side around a vehicle width direction inner side of the edge side as a rotational center.

Specifically, in bottom view, the deflector base portion 21 includes: a front outer peripheral edge portion 211 that is an outer peripheral edge extending from the vehicle front side toward the vehicle width direction outer side and having a substantially circular-arc shape in bottom view; an inner outer peripheral edge portion 212 that is an outer peripheral edge extending from a front end of the front outer peripheral edge portion 211 toward the vehicle rear side; a rear outer peripheral edge portion 213 that is an outer peripheral edge coupling a rear end of the front outer peripheral edge portion 211 and the inner outer peripheral edge portion 212; and a fan-shaped bottom portion 214 that is a portion surrounded by the front outer peripheral edge portion 211, the rear outer peripheral edge portion 213, and the inner outer peripheral edge portion 212 and having a substantially fan shape in bottom view.

As shown in FIGS. 2 and 3, the front outer peripheral edge portion 211 is formed in a substantially circular-arc shape along an outer peripheral edge of the front bumper 6 in bottom view and a substantially flat plate shape.

Three bolt insertion holes 211a and one clip insertion hole 211b are formed on the front outer peripheral edge portion 211 in order of one bolt insertion hole 211a, one clip insertion hole 211b, and two bolt insertion hole 211a from the vehicle front side toward the vehicle width direction outer side. Bolts 11 threadedly engaged with a lower surface of the front bumper 6 while sandwiching the liner extended portion 9b are inserted into the respective bolt insertion holes 211a. A resin clip 12 engaged with the lower surface of the front bumper 6 while sandwiching the liner extended portion 9b is inserted into the clip insertion hole 211b.

As shown in FIGS. 2 and 3, the inner outer peripheral edge portion 212 extends from the front end of the front outer peripheral edge portion 211 toward a vehicle rear upper side and then further extends toward the vehicle rear side. The inner outer peripheral edge portion 212 extends such that a rear end thereof is located at the vehicle rear side of the deflector main body 22.

A bolt insertion hole 212a is formed on a vehicle forward/rearward direction substantially middle of the inner outer peripheral edge portion 212, and a bolt 13 that fixes the engine under cover 10 is inserted into the bolt insertion hole 212a. Further, a bolt insertion hole 212b is formed on the rear end of the inner outer peripheral edge portion 212, and a bolt 14 threadedly engaged with the liner extended portion 9b is inserted into the bolt insertion hole 212b.

As shown in FIGS. 2 and 3, the rear outer peripheral edge portion 213 is formed so as to couple the rear end of the front outer peripheral edge portion 211 and the inner outer peripheral edge portion 212 to each other in the vehicle width direction. As shown in FIG. 4, the rear outer peripheral edge portion 213 is formed such that an upper surface thereof contacts the lower surface of the liner extended portion 9b with the rear outer peripheral edge portion 213 attached to the liner extended portion 9b.

Further, an outer bolt insertion hole 213a, a middle clip insertion hole 213b, and an inner clip insertion hole 213c, whose positions are substantially the same as one another in the vehicle forward/rearward direction, are formed on the rear outer peripheral edge portion 213 at predetermined intervals in the vehicle width direction in this order from the vehicle width direction outer side.

Specifically, the outer bolt insertion hole 213a located at the vehicle width direction outer side on the rear outer peripheral edge portion 213 is formed such that a bolt 15 threadedly engaged with the lower surface of the front bumper 6 while sandwiching the liner extended portion 9b can be inserted into the outer bolt insertion hole 213a.

The middle clip insertion hole 213b that is a clip insertion hole located at a vehicle width direction substantially middle of the rear outer peripheral edge portion 213 and the inner clip insertion hole 213c that is a clip insertion hole located at the vehicle width direction inner side of the rear outer peripheral edge portion 213 are formed such that resin clips 16 engaged with the liner extended portion 9b can be inserted into the respective clip insertion holes 213b and 213c.

As shown in FIG. 3, the fan-shaped bottom portion 214 is formed in a substantially fan shape in bottom view in such a manner that a portion surrounded by the front outer peripheral edge portion 211, the inner outer peripheral edge portion 212, and the rear outer peripheral edge portion 213 projects toward the vehicle lower side. As shown in FIG. 4, a lower surface of the fan-shaped bottom portion 214 is formed in such an inclined shape in side view that a rear end thereof is located at the vehicle lower side of a front end thereof.

As shown in FIGS. 3 and 4, the deflector main body 22 is integrally formed by: a flat plate portion 221 extending form a rear end of the rear outer peripheral edge portion 213 toward the vehicle lower side and having a substantially flat plate shape; and a flange portion 222 projecting from an edge side of the flat plate portion 221 toward the vehicle rear side.

As shown in FIGS. 5 and 6, the flat plate portion 221 is formed in a substantially flat plate shape having flexibility and a predetermined thickness in the vehicle forward/rearward direction. Further, the flat plate portion 221 is formed in such a lower end stepped shape that a vehicle upward/downward direction length of the vicinity of a vehicle width direction inner end portion thereof is shorter than a vehicle upward/downward direction length of the other portion thereof.

As shown in FIGS. 4 to 6, the flange portion 222 is formed along an edge side extending from an upper end of a vehicle width direction outer side of the flat plate portion 221 to a vehicle width direction inner side of a lower edge of the flat plate portion 221 and has a thickness substantially equal to the thickness of the flat plate portion 221.

As shown in FIGS. 3 and 5, a slit opening 22a that is an opening extending toward the vehicle upper side and having a slit shape is formed on the deflector main body 22. The slit opening 22a has a function of promoting bending deformation of the deflector main body 22 toward the vehicle front side when a load from the vehicle rear side is applied to the deflector main body 22.

Specifically, the slit opening 22a is formed at a position located at the vehicle width direction outer side of the middle clip insertion hole 213b and close to the middle clip insertion hole 213b. The slit opening 22a is formed so as to extend from the lower end of the deflector main body 22 toward the vehicle upper side and have such a vehicle upward/downward direction length that an upper end thereof is located between a vehicle upward/downward direction substantially middle of the deflector main body 22 and a lower surface of the rear outer peripheral edge portion 213.

As shown in FIGS. 3 to 5, five rear-surface ribs 23 each projecting toward the vehicle rear side and extending in the vehicle upward/downward direction are formed on a rear surface of the deflector main body 22 at predetermined intervals in the vehicle width direction.

As shown in FIGS. 3, 4, and 6, four front-surface ribs 24 each projecting toward the vehicle front side and extending in the vehicle upward/downward direction are formed on a front surface of the deflector main body 22 at predetermined intervals in the vehicle width direction.

As shown in FIGS. 3 to 5, a sectional shape of each rear-surface rib 23 in a substantially horizontal section is a substantially rectangular shape. The rear-surface rib 23 is formed to have a vehicle upward/downward direction length extending from an upper end of the rear outer peripheral edge portion 213 to the flange portion 222.

Specifically, in side view, the rear-surface rib 23 is constituted by: a rib lower portion extending from the flange portion 222 to a vehicle upward/downward direction substantially middle of the flat plate portion 221; and a rib upper portion extending from the rib lower portion toward the vehicle upper side such that a rear end thereof is inclined toward the vehicle rear side as it extends toward the vehicle upper side.

An upper end of the rear-surface rib is formed in such a shape as to include an upper end surface coupled to the rear outer peripheral edge portion 213 and be continuous with an upper surface of the rear outer peripheral edge portion 213. To be specific, the upper end surface of the rear-surface rib 23 is formed to be contactable with the lower surface of the liner extended portion 9b with the rear-surface rib 23 attached to the fender liner 9.

As shown in FIGS. 3 and 5, two rear-surface ribs 23 each having the above shape are formed at the deflector main body 22 so as to be located at the vehicle width direction outer side of the slit opening 22a, and three rear-surface ribs 23 each having the above shape are formed at the deflector main body 22 so as to be located at the vehicle width direction inner side of the slit opening 22a.

For ease of specific explanations, these five rear-surface ribs 23 are referred to as a first rear-surface rib 23a, a second rear-surface rib 23b, a third rear-surface rib 23c, a fourth rear-surface rib 23d, and a fifth rear-surface rib 23e arranged in this order from the vehicle width direction outer side.

As shown in FIG. 3, the first rear-surface rib 23a is formed at a vehicle width direction position that is substantially the same as a vehicle width direction position of the outer bolt insertion hole 213a.

As shown in FIG. 3, the second rear-surface rib 23b is formed at a vehicle width direction position that is substantially the same as a vehicle width direction substantially middle between the outer bolt insertion hole 213a and the middle clip insertion hole 213b.

As shown in FIG. 3, the third rear-surface rib 23c is formed at a vehicle width direction position that is substantially the same as a vehicle width direction position of the middle clip insertion hole 213b.

As shown in FIG. 3, the fourth rear-surface rib 23d is formed at a vehicle width direction position that is substantially the same as a vehicle width direction substantially middle between the middle clip insertion hole 213b and the inner clip insertion hole 213c.

As shown in FIG. 3, the fifth rear-surface rib 23e is formed at a vehicle width direction position that is substantially the same as a vehicle width direction position of the inner clip insertion hole 213c.

Further, as shown in FIGS. 3, 4, and 6, a sectional shape of each front-surface rib 24 in a substantially horizontal section is a substantially rectangular shape. The front-surface rib 24 is formed to have a vehicle upward/downward direction length that is shorter than the vehicle upward/downward direction length of the rear-surface rib 23.

Specifically, as shown in FIGS. 3 and 4, the front-surface rib 24 extends from a position of the lower surface of the rear outer peripheral edge portion 213 which position is located at the vehicle rear side of a vehicle forward/rearward direction substantially middle between a front surface of the deflector main body 22 and a rear end of the bolt 15 or a rear end of the resin clip 16. The front-surface rib 24 is formed in such a substantially triangular shape in side view that: an apex of the triangular shape is located at a lower end thereof and a vehicle upward/downward direction length thereof is longer than a vehicle forward/rearward direction length thereof.

As shown in FIGS. 3 and 6, two front-surface ribs 24 each having the above shape are formed at the deflector main body 22 so as to be located at the vehicle width direction outer side of the slit opening 22a, and two front-surface ribs 24 each having the above shape are formed at the deflector main body 22 so as to be located at the vehicle width direction inner side of the slit opening 22a.

For ease of specific explanations, these four front-surface ribs 24 are referred to as a first front-surface rib 24a, a second front-surface rib 24b, a third front-surface rib 24c, and a fourth front-surface rib 24d arranged in this order from the vehicle width direction outer side.

As shown in FIG. 3, the first front-surface rib 24a and the second front-surface rib 24b are formed between the first rear-surface rib 23a and the second rear-surface rib 23b so as to be located at respective positions spaced apart from each other by a predetermined interval in the vehicle width direction.

As shown in FIG. 3, the third front-surface rib 24c and the fourth front-surface rib 24d are formed between the third rear-surface rib 23c and the fourth rear-surface rib 23d so as to be located at respective positions spaced apart from each other by a predetermined interval in the vehicle width direction.

To be specific, the front-surface ribs 24 are formed at respective positions that are different from the positions of the rear-surface ribs 23, the bolt 15, and the two resin clips 16 in the vehicle width direction.

The deflector structure of the automobile 1 configured as above can secure both the rigidity of the deflector main body 22 with respect to the load applied from the vehicle front side and the flexibility of the deflector main body 22 with respect to the load applied from the vehicle rear side.

Specifically, when the load is applied from the vehicle front side to the deflector main body 22, the deflector main body 22 is about to deform so as to be bent toward the vehicle rear side. In this case, since the rear-surface ribs 23 are in contact with the lower surface of the liner extended portion 9b, the rear-surface ribs 23 can support the deflector main body 22 from the vehicle rear side.

Therefore, when the load is applied from the vehicle front side to the deflector main body 22, the deflector structure of the automobile 1 can suppress the bending deformation of the deflector main body 22 toward the vehicle rear side by the rear-surface ribs 23.

In contrast, when the load is applied from the vehicle rear side to the deflector main body 22, the deflector main body 22 is about to deform so as to be bent toward the vehicle front side. In this case, since the rear-surface ribs 23 can easily separate from the lower surface of the liner extended portion 9b, the rear-surface ribs 23 can deform so as to be bent toward the vehicle front side together with the deflector main body 22.

Therefore, when the load is applied from the vehicle rear side to the deflector main body 22, the deflector structure of the automobile 1 can easily cause the bending deformation of the deflector main body 22 toward the vehicle front side.

With this, the deflector structure of the automobile 1 can suppress the flow of the traveling wind into the wheel housing 8 and can also prevent the deflector main body 22 from being damaged by an unintentional load applied from the vehicle rear side.

Therefore, the deflector structure of the automobile 1 can secure both the rigidity of the deflector main body 22 with respect to the load applied from the vehicle front side and the flexibility of the deflector main body 22 with respect to the load applied from the vehicle rear side and can secure stable air straightening performance.

A plurality of front-surface ribs 24 extending from a lower surface of the deflector base portion 21 to the vehicle lower side are formed on the front surface of the deflector main body 22 at predetermined intervals in the vehicle width direction. Therefore, when the load is applied from the vehicle front side to the deflector main body 22, the deflector structure of the automobile 1 can further suppress the bending deformation of the deflector main body 22 toward the vehicle rear side by cooperation of the front-surface ribs 24 and the rear-surface ribs 23.

Therefore, the deflector structure of the automobile 1 can stably suppress the flow of the traveling wind into the wheel housing 8.

On this account, the deflector structure of the automobile 1 can stably secure the rigidity of the deflector main body 22 with respect to the load applied from the vehicle front side.

The front-surface ribs 24 are formed at respective positions different from the positions of the rear-surface ribs 23 in the vehicle width direction. With this, even when the front-surface ribs 24 are provided, the deflector structure of the automobile 1 can secure the flexibility of the deflector main body 22 with respect to the load applied from the vehicle rear side.

Specifically, for example, if the front-surface ribs 24 are formed at respective positions that are substantially the same as the positions of the rear-surface ribs 23 in the vehicle width direction, the front-surface ribs 24 support the rear-surface ribs 23 while sandwiching the deflector main body 22. Therefore, when the load is applied from the vehicle rear side to the deflector main body 22, the bending deformation of the deflector main body 22 toward the vehicle front side may be excessively suppressed.

However, according to the deflector structure of the automobile 1, the front-surface ribs 24 are formed at respective vehicle width direction positions different from the vehicle width direction positions of the rear-surface ribs 23. With this, the deflector structure of the automobile 1 can prevent the front-surface ribs 24 from supporting the rear-surface ribs 23 while sandwiching the deflector main body 22.

With this, when the load is applied from the vehicle rear side to the deflector main body 22, the deflector structure of the automobile 1 can prevent the bending deformation of the deflector main body 22 toward the vehicle front side from being excessively suppressed by the rear-surface ribs 23.

According to the deflector structure of the automobile 1, the front-surface ribs 24 are formed at respective vehicle width direction positions different from the vehicle width direction positions of the rear-surface ribs 23. Therefore, even when the front-surface ribs 24 are provided, the deflector structure of the automobile 1 can secure the flexibility of the deflector main body 22 with respect to the load applied from the vehicle rear side.

Each of the front-surface ribs 24 extends from a position of the lower surface of the deflector base portion 21 which position is located at the vehicle rear side of the vehicle forward/rearward direction substantially middle between the front surface of the deflector main body 22 and the rear end of the bolt 15 or the rear end of the resin clip 16, the bolt 15 and the clip 16 being located at the vehicle front side of the deflector main body 22 and adjacent to the deflector main body 22. With this, the deflector structure of the automobile 1 can prevent engaged states of the bolt 15 and the resin clip 16 from being released by the load applied from the vehicle rear side.

Specifically, when the load is applied from the vehicle rear side to the deflector main body 22, the deflector main body 22 causes the bending deformation so as to be turned toward the vehicle front side around upper front ends of the front-surface ribs 24 as a rotational center.

In this case, the load toward the vehicle lower side which causes the deflector base portion 21 to separate from the liner extended portion 9b gradually from a rear end of the deflector base portion 21 acts on the deflector base portion 21 as the bending deformation of the deflector main body 22 toward the vehicle front side proceeds.

As above, the deflector main body 22 causes the bending deformation so as to be turned toward the vehicle front side around the upper front ends of the front-surface ribs 24 as the rotational center. Therefore, for example, if each of the front-surface ribs 24 extends from a position of the lower surface of the deflector base portion 21 which position is located at the vehicle front side of the bolt 15 and the resin clip 16, the load acting on the deflector base portion 21 toward the vehicle lower side tends to be transmitted to the bolt 15 and the resin clip 16.

Therefore, when the load is applied from the vehicle rear side to the deflector main body 22, the bolt 15 and the resin clip 16 may be separated or damaged by the load acting toward the vehicle lower side.

Each of the front-surface ribs 24 extends from a position of the lower surface of the deflector base portion 21 which position is located at the vehicle rear side of the vehicle forward/rearward direction substantially middle between the front surface of the deflector main body 22 and the rear end of the bolt 15 or the rear end of the resin clip 16. With this, the deflector structure of the automobile 1 can prevent the load acting on the deflector base portion 21 toward the vehicle lower side from being transmitted to the bolt 15 and the resin clip 16.

With this, the deflector structure of the automobile 1 can prevent the separation and damage of the bolt 15 and the resin clip 16 and also prevent the damage of the deflector base portion 21 pressed by the bolt 15 and the resin clip 16.

According to the deflector structure of the automobile 1, each of the front-surface ribs 24 extends from the position located at the vehicle rear side of the vehicle forward/rearward direction substantially middle between the front surface of the deflector main body 22 and the rear end of the bolt 15 or the rear end of the resin clip 16. With this, the deflector structure of the automobile 1 can prevent the engaged states of the bolt 15 and the resin clip 16 from being released by the load applied from the vehicle rear side.

The front-surface ribs 24 are formed at respective vehicle width direction positions different from the vehicle width direction positions of the bolt 15 and the resin clip 16. With this, the deflector structure of the automobile 1 can more surely prevent the engaged states of the bolt 15 and the resin clip 16 from being released by the load applied from the vehicle rear side.

Specifically, for example, if the front-surface ribs 24 are formed at respective vehicle width direction positions that are substantially the same as the vehicle width direction positions of the bolt 15 and the resin clip 16, the load applied from the vehicle rear side to the deflector main body 22 tends to be transmitted to the bolt 15 and the resin clip 16 through the front-surface ribs 24 and the deflector base portions 21 as the load acting toward the vehicle lower side.

Therefore, when the load is applied from the vehicle rear side to the deflector main body 22, the load toward the vehicle lower side acts on the bolt 15 and the resin clip 16, and this may cause the separation or damage of the bolt 15 and the resin clip 16.

However, since the front-surface ribs 24 are formed at respective vehicle width direction positions different from the vehicle width direction positions of the bolt 15 and the resin clip 16, the deflector structure of the automobile 1 can prevent the load acting on the deflector base portion 21 toward the vehicle lower side from acting on the bolt 15 and the resin clip 16.

With this, the deflector structure of the automobile 1 can prevent the separation and damage of the bolt 15 and the resin clip 16 and also prevent the damage of the deflector base portion 21 pressed by the bolt 15 and the resin clip 16.

Therefore, since the front-surface ribs 24 are formed at respective vehicle width direction positions different from the vehicle width direction positions of the bolt 15 and the resin clip 16, the deflector structure of the automobile 1 can more surely prevent the engaged states of the bolt 15 and the resin clip 16 from being released by the load applied from the vehicle rear side.

Further, since the number of front-surface ribs 24 is smaller than the number of rear-surface ribs 23, the deflector structure of the automobile 1 can more surely secure the flexibility of the deflector main body 22 with respect to the load applied from the vehicle rear side.

Specifically, if the number of front-surface ribs 24 is equal to or larger than the number of rear-surface ribs 23, the rigidity of the deflector main body 22 with respect to the load applied from the vehicle rear side may be substantially equal to or higher than the rigidity of the deflector main body 22 with respect to the load applied from the vehicle front side. Therefore, when the load is applied from the vehicle rear side to the deflector main body 22, the bending deformation of the deflector main body 22 toward the vehicle front side may be excessively suppressed.

On this account, the number of front-surface ribs 24 is smaller than the number of rear-surface ribs 23. With this, even when the deflector structure of the automobile 1 is provided with the front-surface ribs 24, the rigidity of the deflector main body 22 with respect to the load applied from the vehicle rear side can be prevented from becoming higher than the rigidity of the deflector main body 22 with respect to the load applied from the vehicle front side.

With this, when the load is applied from the vehicle rear side to the deflector main body 22, the deflector structure of the automobile 1 can more surely prevent the bending deformation of the deflector main body 22 toward the vehicle front side from being excessively suppressed by the front-surface ribs 24.

Therefore, since the number of front-surface ribs 24 is smaller than the number of rear-surface ribs 23, the deflector structure of the automobile 1 can more surely secure the flexibility of the deflector main body 22 with respect to the load applied from the vehicle rear side.

Components of the present invention correspond to the components of the above embodiment as below. To be specific, a front wheel housing of the present invention corresponds to the wheel housing 8 of the above embodiment. Similarly, a cover member corresponds to the liner extended portion 9*b*. An engaging member corresponds to each of the bolts 11, 13, 14, and 15 and the resin clips 12 and 16. An engaging member located at the vehicle front side of the deflector main body and adjacent to the deflector main body corresponds to each of the bolt 15 and the resin clip 16. However, the present invention is not limited to the components of the above embodiment, and various embodiments may be made.

Figure 7:
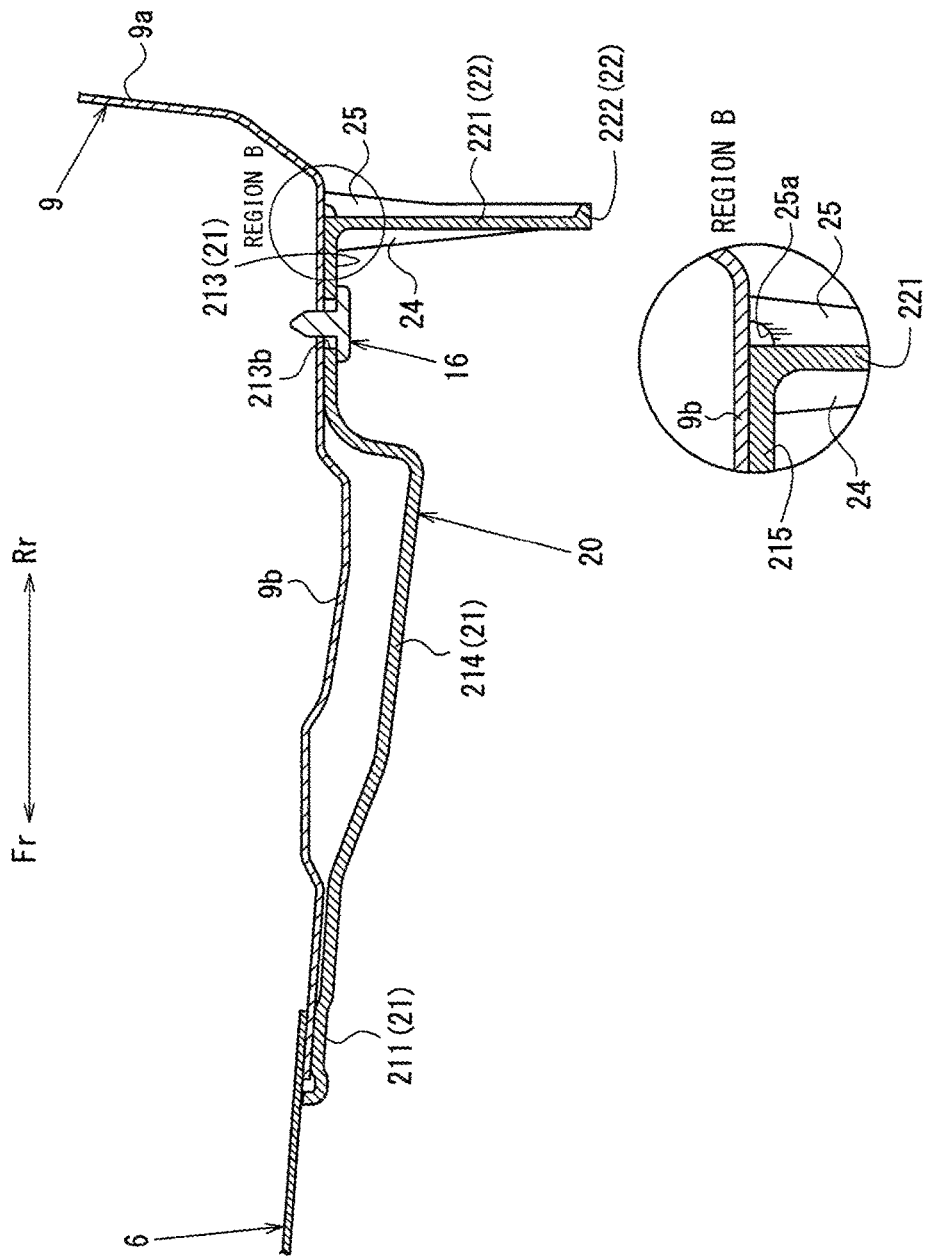
FIG. 7 is a sectional view taken along line A-A in another embodiment.

For example, in the above embodiment, the rear-surface ribs 23 are coupled to the rear outer peripheral edge portion 213 of the deflector base portion 21. However, the above embodiment is not limited to this. As in FIG. 7 showing a sectional view taken along line A-A in another embodiment, the rear-surface ribs 25 may be configured such that: a cutout portion 25*a* is provided at a front side of an upper end of each rear-surface rib 25; and the front side of the upper end of the rear-surface rib 25 is not coupled to the rear outer peripheral edge portion 213.

The same effects as the above embodiment can be obtained even by this configuration. Further, since the rear-surface ribs 25 are not coupled to the deflector base portion 21, the bending deformation of the deflector main body 22 toward the vehicle front side can be further prevented from being hindered by the rear-surface ribs 25 when the load is applied from the vehicle rear side to the deflector main body 22.

Therefore, since the cutout portion 25a is provided at the upper end of each rear-surface rib 25, the deflector structure of the automobile 1 can more stably secure the rigidity of the deflector main body 22 with respect to the load applied from the vehicle front side and the flexibility of the deflector main body 22 with respect to the load applied from the vehicle rear side.

The opening surrounded by the front end of the wheel housing 8, the front bumper 6, and the engine under cover 10 and having a substantially fan shape in bottom view is covered with the liner extended portion 9b extending from the fender liner 9. However, the above embodiment is not limited to this, and the opening may be covered with a cover member configured separately from the fender liner 9. In this case, the rear-surface ribs 23 of the deflector 20 are configured to be contactable with a lower surface of the cover member.

The sectional shape of the rear-surface rib 23 in a substantially horizontal section is a substantially rectangular shape. However, the above embodiment is not limited to this. For example, the sectional shape of the rear-surface rib in a substantially horizontal section may be a substantially mountain shape or a substantially trapezoidal shape.

Further, the sectional shape of the front-surface rib 24 in a substantially horizontal section is a substantially rectangular shape. However, the above embodiment is not limited to this. For example, the sectional shape of the front-surface rib in a substantially horizontal section may be a substantially mountain shape or a substantially trapezoidal shape.

To further suppress the bending deformation of the deflector main body 22 toward the vehicle rear side, it is desirable that the front-surface rib 24 be formed such that a vehicle upward/downward direction length thereof is longer than a vehicle forward/rearward direction length thereof in side view.

The deflector 20 is attached and fixed to the liner extended portion 9b by using a plurality of bolts and a plurality of resin clips. However, the above embodiment is not limited to this. The deflector 20 may be attached and fixed to the liner extended portion 9b by using a plurality of bolts. Or, the deflector 20 may be attached and fixed to the liner extended portion 9b by using a plurality of resin clips.

LIST OF REFERENCE CHARACTERS 1 automobile
2 vehicle front portion
8 wheel housing
9b liner extended portion
11, 13, 14, 15 bolt
12, 16 resin clip
20 deflector
21 deflector base portion
22 deflector main body
23, 25 rear-surface rib
24 front-surface rib

The invention claimed is:

1. A deflector structure of an automobile, the deflector structure comprising:
a cover member covering a lower-surface opening located at a vehicle front side of a front wheel housing of a vehicle front portion of the automobile; and
a deflector attached to the cover member, wherein:
the deflector is integrally configured by
a deflector base portion attached to the cover member through an engaging member and
a substantially flat plate-shaped deflector main body extending from a rear end of the deflector base portion to a vehicle lower side and having flexibility and a thickness in a vehicle forward/rearward direction; and
a plurality of rear-surface ribs each extending in a vehicle upward/downward direction are formed on a rear surface of the deflector main body at predetermined intervals in a vehicle width direction, upper ends of the rear-surface ribs being in contact with a lower surface of the cover member.

2. The deflector structure according to claim 1, wherein a plurality of front-surface ribs each extending from a lower surface of the deflector base portion to the vehicle lower side are formed on a front surface of the deflector main body at predetermined intervals in the vehicle width direction.

3. The deflector structure according to claim 2, wherein the front-surface ribs are formed at respective positions different from positions of the rear-surface ribs in the vehicle width direction.

4. The deflector structure according to claim 3, wherein each of the front-surface ribs is formed to extend from a position of the lower surface of the deflector base portion, the position being located at a vehicle rear side of a vehicle forward/rearward direction substantially middle between a rear end of the engaging member located at the vehicle front side of the deflector main body and adjacent to the deflector main body and the front surface of the deflector main body.

5. The deflector structure according to claim 4, wherein the front-surface ribs are formed at respective positions different from a position of the engaging member in the vehicle width direction, the engaging member being located at the vehicle front side of the deflector main body and adjacent to the deflector main body.

6. The deflector structure according to claim 5, wherein the number of front-surface ribs is smaller than the number of rear-surface ribs.

7. The deflector structure according to claim 2, wherein each of the front-surface ribs is formed to extend from a position of the lower surface of the deflector base portion, the position being located at a vehicle rear side of a vehicle forward/rearward direction substantially middle between a rear end of the engaging member located at the vehicle front side of the deflector main body and adjacent to the deflector main body and the front surface of the deflector main body.

8. The deflector structure according to claim 2, wherein the front-surface ribs are formed at respective positions different from a position of the engaging member in the vehicle width direction, the engaging member being located at the vehicle front side of the deflector main body and adjacent to the deflector main body.

9. The deflector structure according to claim 2, wherein the number of front-surface ribs is smaller than the number of rear-surface ribs.

* * * * *